C. RUDKIEWICZ.
OUTLET BOX.
APPLICATION FILED AUG. 8, 1910.
982,535. Patented Jan. 24, 1911.
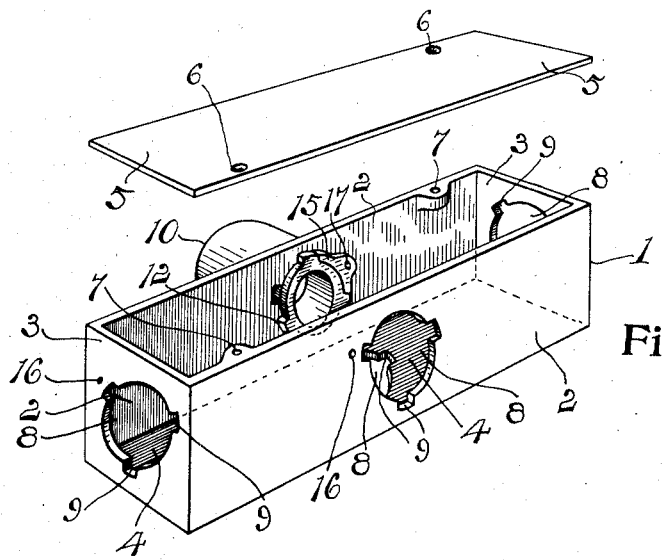
Fig. 1
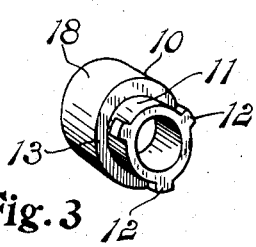
Fig. 3
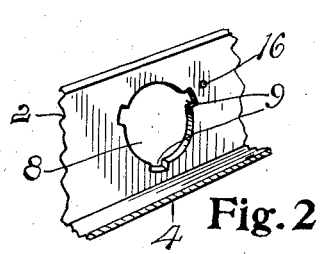
Fig. 2
Fig. 4
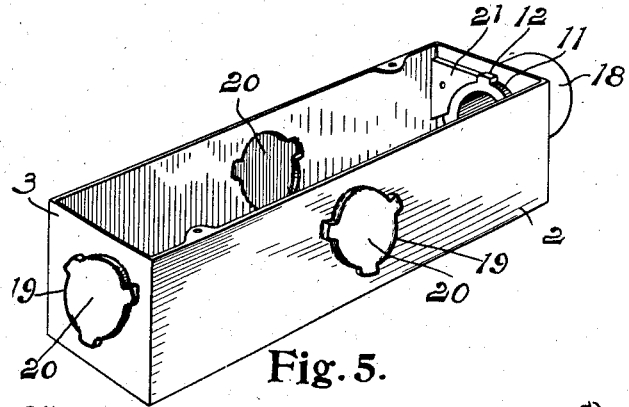
Fig. 5
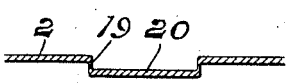
Fig. 6.
Witnesses
O. M. Shannon.
I. E. McGrann.
Inventor
Clarence Rudkiewicz
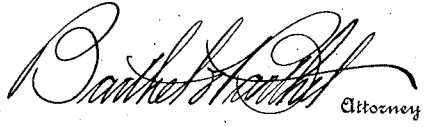
By
Attorney

UNITED STATES PATENT OFFICE.

CLARENCE RUDKIEWICZ, OF DETROIT, MICHIGAN.

OUTLET-BOX.

982,535.

Specification of Letters Patent. Patented Jan. 24, 1911.

Application filed August 8, 1910. Serial No. 576,032.

*To all whom it may concern:*

Be it known that I, CLARENCE RUDKIEWICZ, a citizen of the United States of America, residing at Detroit, in the county of Wayne and State of Michigan, have invented certain new and useful Improvements in Outlet-Boxes, of which the following is a specification, reference being had therein to the accompanying drawings.

This invention relates to an improved outlet box for electrical conduit work and its object is to provide a device for the purpose which is so constructed that it may be used in any position and the conduits led into it from either side, end or bottom and further to provide socket members which may be quickly and easily inserted in openings in the casing and attached thereto to receive the ends of iron pipes for inclosing the conduits.

Referring to the drawing, Figure 1 is a perspective view of a device embodying the invention with the cover detached; Fig. 2 is a perspective detail showing the inner face of a wall of the box or casing; Fig. 3 is a perspective view of a socket member detached; Fig. 4 is a perspective view of a securing member; Fig. 5 is a perspective view of a modified construction; and Fig. 6 is a sectional detail of the construction shown in Fig. 5.

This device is especially adapted for work where the electrical conduits are inclosed within iron pipes and forms a connection where the conduits meet and where branches are taken off to support and hold the ends of the pipes and receive the ends of the conduits.

In the drawing 1 represents a rectangular box having sides 2, ends 3 and a bottom 4. The open top of the box is closed by a plate 5 secured to the box in any suitable manner as by screws passing through openings 6 in the plate and engaging similar openings in suitable ears or projections 7 upon the sides of a box at their upper edges. Each side, end and the bottom of the box or casing is provided with a circular opening 8 having a plurality of laterally extending notches 9 and a detachable socket member 10 having a reduced inner end 11 to fit within any one of the openings 8, is provided with a plurality of outwardly extending lugs 12 on its reduced end adapted to be passed through the notches 9 when the socket member is inserted in one of the openings. These lugs 12 are spaced from a shoulder 13 formed by the reduced end 11 and thus when said reduced end is inserted through one of the openings 8 and the socket member then turned, said lugs will engage the inner face of the wall of the box and securely hold the socket member in place in the opening. To firmly hold the socket member from turning and becoming detached, a securing member 15 is provided which is shaped at its inner side to fit the curve of the reduced end 11 of the socket member and is of a length to just fit between two of the lugs 12. After the socket member has been inserted in one of the openings and turned, this securing member is placed between two of the lugs and against the inner face of the wall of the box and made fast by a screw which is inserted through a hole 16 in the wall and screwed into a corresponding hole 17 in the member 15.

The outer enlarged end 18 of the socket member 10 may be internally screwthreaded or otherwise suitably formed to receive the end of an iron pipe which forms the casing for the electrical conduit which is led through the pipe and through the socket member into the box or casing 1 where branches may be taken off and led through the other openings. One or more of the socket members may be used as desired and if found desirable, suitable closures for the several openings not in use, may be provided.

In Figs. 5 and 6 the box is shown as formed of sheet metal with the metal of the sides, ends and bottom pressed outward at 19 in a form corresponding to the openings 8 and their radial notches, the metal being drawn in such a manner that it is nearly severed along a line conforming to the shape of the desired opening and thus the projecting metal disks 20 may be readily punched out when it is desired to use one of the openings, said disks forming a closure integral with the box until so knocked out. To hold the socket members from turning when inserted through the end walls, a triangular shaped member 21 may be provided, one side of which will engage the side wall of the box.

Having thus fully described my invention what I claim is:—

1. An outlet box comprising a wall formed with a circular opening having a plurality of laterally extending notches, a tubular socket member adapted to receive a pipe at its outer end and having a reduced inner end to fit said opening and forming a shoulder to engage the outer face of the wall, a series of outwardly extending lugs on the reduced end of the socket member spaced from said shoulder, and a member adapted to be secured on the inner side of the wall of the box to engage one of said lugs and prevent the turning of the socket member.

2. An outlet box comprising a wall having a circular opening therein formed with radially extending notches, a socket member having an outer end adapted to receive a pipe and a reduced inner end to fit said opening, said reduced end forming a shoulder to engage the outer side of the wall, radially extending lugs on the reduced end of the socket member spaced from said shoulder and adapted to pass through the said notches and engage the inner face of the wall when the socket member is turned, and a securing member adapted to be secured to the inner face of the wall and of a length to fit between two of the said lugs in engagement therewith to prevent the turning of the socket member in either direction.

3. An outlet box comprising side and end walls and a bottom each formed with a circular opening having radially extending notches, a tubular socket member formed at its outer end to receive a pipe and reduced at its inner end to fit any one of the said openings and to form a shoulder upon the socket member to engage the outer face of the wall, radially extending lugs on the reduced end of the socket member spaced from said shoulder, a securing member curved at one side to fit the curve of the reduced end of the socket member and of a length to fit between two of the said lugs, means for securing said member to the inner face of the wall in engagement with said lugs, and a plate detachably secured to the open top of the box to close the same.

In testimony whereof I affix my signature in presence of two witnesses.

CLARENCE RUDKIEWICZ.

Witnesses:
C. R. STICKNEY,
OTTO F. BARTHEL.